(12) United States Patent
Puppini et al.

(10) Patent No.: US 7,967,349 B2
(45) Date of Patent: Jun. 28, 2011

(54) SIDE IMPACT GUARD DEVICE FOR INDUSTRIAL VEHICLES, PARTICULARLY TRAILERS OR SEMI-TRAILERS

(75) Inventors: Roberto Puppini, Orbassano (IT); Giancarlo Francone, Orbassano (IT)

(73) Assignee: C.R.F. Societa Consortile per Azioni, Orbassano (Turin) (IT)

( * ) Notice: Subject to any disclaimer, the term of this patent is extended or adjusted under 35 U.S.C. 154(b) by 119 days.

(21) Appl. No.: 12/419,767

(22) Filed: Apr. 7, 2009

(65) Prior Publication Data
US 2009/0267365 A1 Oct. 29, 2009

(30) Foreign Application Priority Data

Apr. 29, 2008 (EP) .................................. 08425298

(51) Int. Cl.
*B60R 19/56* (2006.01)
(52) U.S. Cl. ... 293/107; 293/118; 293/128; 296/187.12; 296/37.3; 224/42.23
(58) Field of Classification Search .................. 293/107, 293/118, 117, 126, 128; 296/187.12, 37.3, 296/184.1; 224/42.23
See application file for complete search history.

(56) References Cited

U.S. PATENT DOCUMENTS

| | | | | |
|---|---|---|---|---|
| 2,512,527 A * | 6/1950 | Hoffman | ........................ | 293/118 |
| 3,708,195 A | 1/1973 | Kottsieper | | |
| 3,847,427 A | 11/1974 | Eshelman | | |
| 3,866,962 A | 2/1975 | Eshelman | | |
| 3,912,099 A * | 10/1975 | Liebermann | ................... | 414/465 |
| 4,060,268 A * | 11/1977 | Page, Jr. | ......................... | 293/128 |
| 4,217,715 A * | 8/1980 | Bryan, Jr. | ......................... | 40/591 |
| 4,386,722 A * | 6/1983 | Gearhart | ..................... | 224/42.23 |
| 4,418,852 A * | 12/1983 | Grinwald | ..................... | 224/42.23 |
| 4,688,824 A * | 8/1987 | Herring | .......................... | 280/762 |
| 4,958,870 A * | 9/1990 | Carter | ............................ | 293/106 |
| 5,280,990 A * | 1/1994 | Rinard | ....................... | 296/180.1 |
| 6,652,010 B1 | 11/2003 | Huddle et al. | | |
| 6,974,166 B2 * | 12/2005 | Ledford et al. | ................ | 293/102 |
| 6,988,754 B1 | 1/2006 | Watts | | |
| 7,093,889 B2 * | 8/2006 | Graham | ..................... | 296/180.4 |
| 7,188,875 B2 * | 3/2007 | Norelius | ........................ | 293/128 |
| 7,407,204 B2 * | 8/2008 | Eriksson et al. | .............. | 293/102 |

(Continued)

FOREIGN PATENT DOCUMENTS

DE 2 054 429 5/1972
DE 10 2007 003 916 7/2008

OTHER PUBLICATIONS

European Search Report for EP Application No. 08425298, mailed Oct. 20, 2008.

*Primary Examiner* — Glenn Dayoan
*Assistant Examiner* — Gregory Blankenship
(74) *Attorney, Agent, or Firm* — Nixon & Vanderhye P.C.

(57) ABSTRACT

An industrial vehicle, in particular a trailer or semi-trailer, comprises on its two sides two side-impact guard devices each comprising at least one bar extending in the longitudinal direction of the vehicle and connected to the frame of the vehicle. Set between the bars of the two side-impact guard devices is a housing structure for one or more spare wheels, in such a way that said housing structure and the spare wheel or wheels housed therein contribute, together with the aforesaid bars, to absorbing the energy of a lateral impact.

9 Claims, 11 Drawing Sheets

U.S. PATENT DOCUMENTS

| | | | |
|---|---|---|---|
| 7,530,612 B2 * | 5/2009 | Regnell et al. | 293/118 |
| 7,578,541 B2 * | 8/2009 | Layfield et al. | 296/180.2 |
| 7,780,224 B2 * | 8/2010 | Roush | 296/180.4 |
| 2007/0228748 A1 * | 10/2007 | Ryan et al. | 293/118 |
| 2008/0116702 A1 * | 5/2008 | Enz et al. | 293/128 |
| 2009/0267365 A1 * | 10/2009 | Puppini et al. | 293/118 |

* cited by examiner

SIDE IMPACT GUARD DEVICE FOR INDUSTRIAL VEHICLES, PARTICULARLY TRAILERS OR SEMI-TRAILERS

BACKGROUND OF THE INVENTION

The present invention relates to devices for protection against impact for industrial vehicles, in particular trailers or semi-trailers, i.e., to the so-called "impact guard devices" or "impact guards", which are used in vehicles of this type in order to prevent or at least counter penetration underneath them of another vehicle of smaller height, for example, a motor car, that might collide with the vehicle of greater height at the back or at the side.

An example of a device of this sort, used as rear guard, is illustrated in U.S. Pat. No. 6,652,010 B1.

The present invention relates in particular to a side-impact guard device that can be used in general in any industrial vehicle and in particular in trailers and semi-trailers.

According to the conventional technique, side-impact guards for trailers and semi-trailers are already envisaged, which comprise at least one bar provided on each side of the vehicle and extending in the longitudinal direction of the vehicle, said bar being rigidly connected to the frame of the vehicle.

Experiments conducted by the present applicant have, however, demonstrated that the side-impact guard devices produced up to now are not able to guarantee an adequate safety for the occupants of a motor car that hits an industrial vehicle at the side. An impact at an even relatively low speed produces, in fact, a deformation of the bar that absorbs in part the impact, but is not in general capable of preventing penetration of the motor car underneath the industrial vehicle for a length sufficient not to involve in the impact also the passenger compartment of the motor car.

SUMMARY OF THE INVENTION

The object of the present invention is to propose a new impact guard device of the type referred to above that will enable, on the one hand, a considerable improvement in safety for the occupants of a motor car that hits a vehicle provided with said device laterally, without thereby entailing a complication and a considerable increase in weight of the structure of the vehicle on which it is provided.

With a view to achieving the above purpose, the subject of the invention is an industrial vehicle, in particular a trailer or semi-trailer, of the type comprising a frame including two side members parallel to one another and set at a distance from one another and two side-impact guard devices, provided on the two sides of the vehicle, each comprising at least one bar extending in the longitudinal direction of the vehicle and connected to the aforesaid frame, said industrial vehicle being characterized in that set between the bars of the two impact guard devices on the two sides of the vehicle is a structure that houses one or more spare wheels, in such a way that said housing structure and the spare wheel or wheels housed therein contribute, together with the bars of the aforesaid impact guard devices, to absorbing the energy of a lateral impact against the vehicle, transmitting it from the impact guard device that has undergone impact to the impact guard device set on the opposite side of the vehicle.

It should be noted that the idea of exploiting a spare wheel and in some cases also the structure in which it is housed as part of a bumper device, designed to absorb the energy of a front impact or of a rear impact in a motor car, has already been proposed in the documents Nos. U.S. Pat. Nos. 3,708, 195, 3,866,962 and 6,988,754 B1. In the case of the present invention, this principle is, however, applied in a new way by setting the spare wheel or wheels, as well as the corresponding housing structure, in a direction transverse to the longitudinal direction of a vehicle, in particular of a trailer or a semi-trailer, between two impact guard devices set at the two sides of the vehicle, in such a way that the spare wheel or wheels and the corresponding housing structure are exploited for absorbing impact not only in one direction, but also in two opposite directions, transverse to the vehicle, and for transmitting the impact from the impact guard device set on one side of the vehicle to the impact guard device set on the other side, thus discharging the majority of the impact energy on the side members of the frame.

In a preferred embodiment, the aforesaid housing structure houses two spare wheels arranged lying horizontally, with their axes vertical and contained in a plane substantially orthogonal to the longitudinal direction of the vehicle. Said structure preferably comprises a resting surface for the spare wheels and end walls mounted on said resting surface in a removable way, to allow access to the space containing the spare wheels. Once again for said purpose, at least one of the two side-impact guard devices has one or more protection bars, which are connected to the frame of the vehicle in an articulated way so as to be able to be displaced between an operative, lowered, position, in which said bars are in front of the respective end wall of the structure for housing the spare wheels, and an inoperative, raised, position, to enable access to the spare wheels.

According to a further preferred characteristic, in the structure for housing the spare wheels, set in a removable way between each wheel and the end wall of said structure that is adjacent to the spare wheel are two safety wheel chucks of the type normally used for safety reasons when the vehicle is standing still, which are rested on the ground on one side of a wheel in order to prevent any undesirable movement of the vehicle. Said safety chucks have one surface for resting on the ground and one curved and concave surface for engagement with the tread of the wheel. In the case of the aforesaid preferred embodiment, provided at each end of the structure for housing the spare wheels are two safety chucks of the type indicated above, with their curved surfaces facing the tread of the spare wheel so as to define together an arched housing surface.

In the case of the aforesaid preferred embodiment, any lateral impact against either of the two side-impact guard devices is absorbed by the chain of elements constituted by the protection bar that receives the impact, by the end wall of the structure for housing the spare wheels that is set behind said bar, by the two safety chucks set behind said end wall, and then by the pair of spare wheels, with the portion of the housing structure that is set between them, as well as, on the opposite side of the vehicle, by another pair of parking chucks, by the opposite end wall of the housing structure, and by the bar or bars for protection against impact, which are provided on the opposite side of the vehicle.

Consequently, as may be seen, provided in the device according to the invention is a structure for absorption of the impact that is far more effective than the known structures, without this entailing any substantial complication or increase in weight of the structure of the vehicle, given that in any case it must be provided with a structure for housing the spare wheels.

BRIEF DESCRIPTION OF THE DRAWINGS

Further characteristics and advantages of the invention will emerge from the ensuing description with reference to the annexed figures of drawing, which are provided purely by way of non-limiting example and in which.

DETAILED DESCRIPTION OF THE INVENTION

Figure 1:
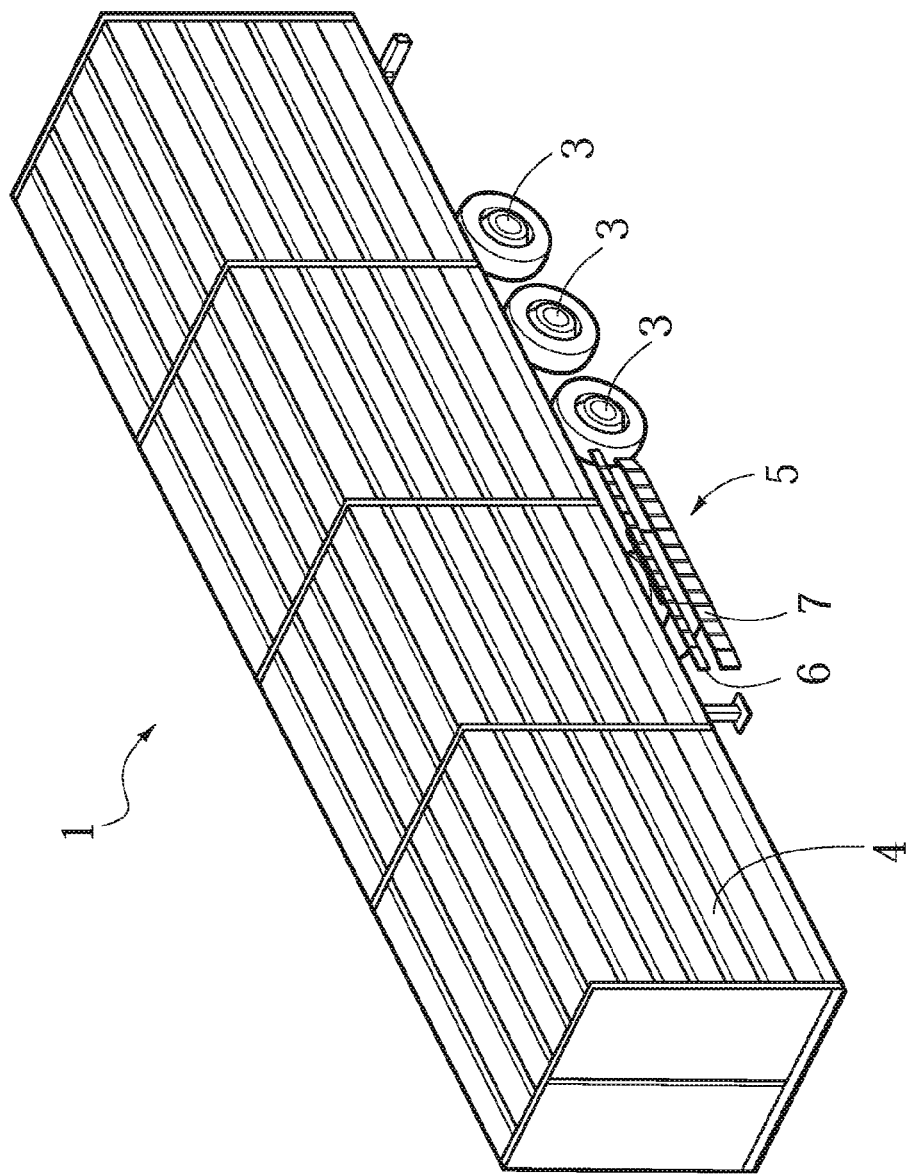
FIG. 1 is a schematic axonometric view of a semi-trailer provided with a preferred embodiment of the device according to the invention.
Figure 2:
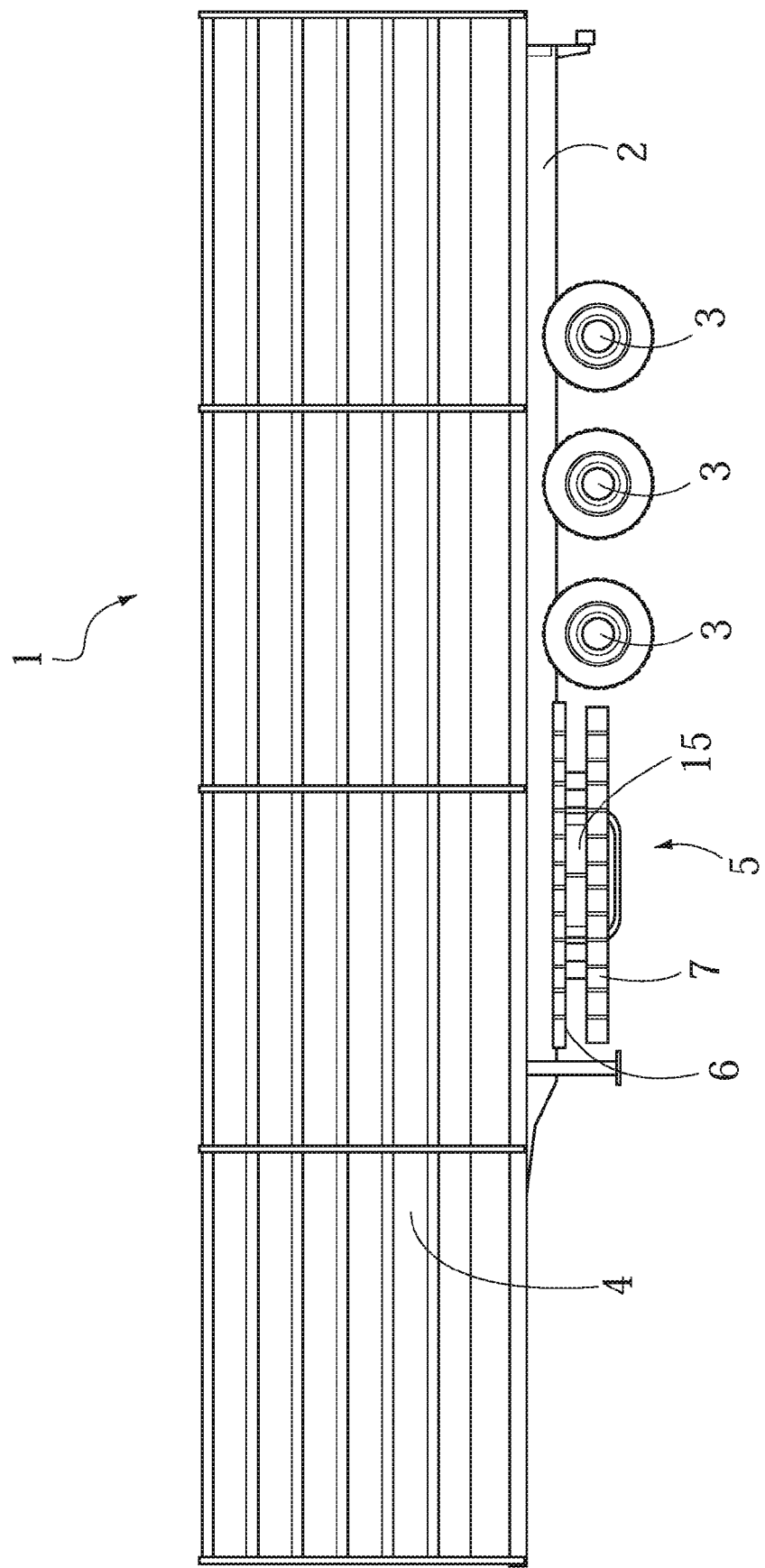
FIG. 2 is a side view of the vehicle of FIG. 1.
Figure 3:
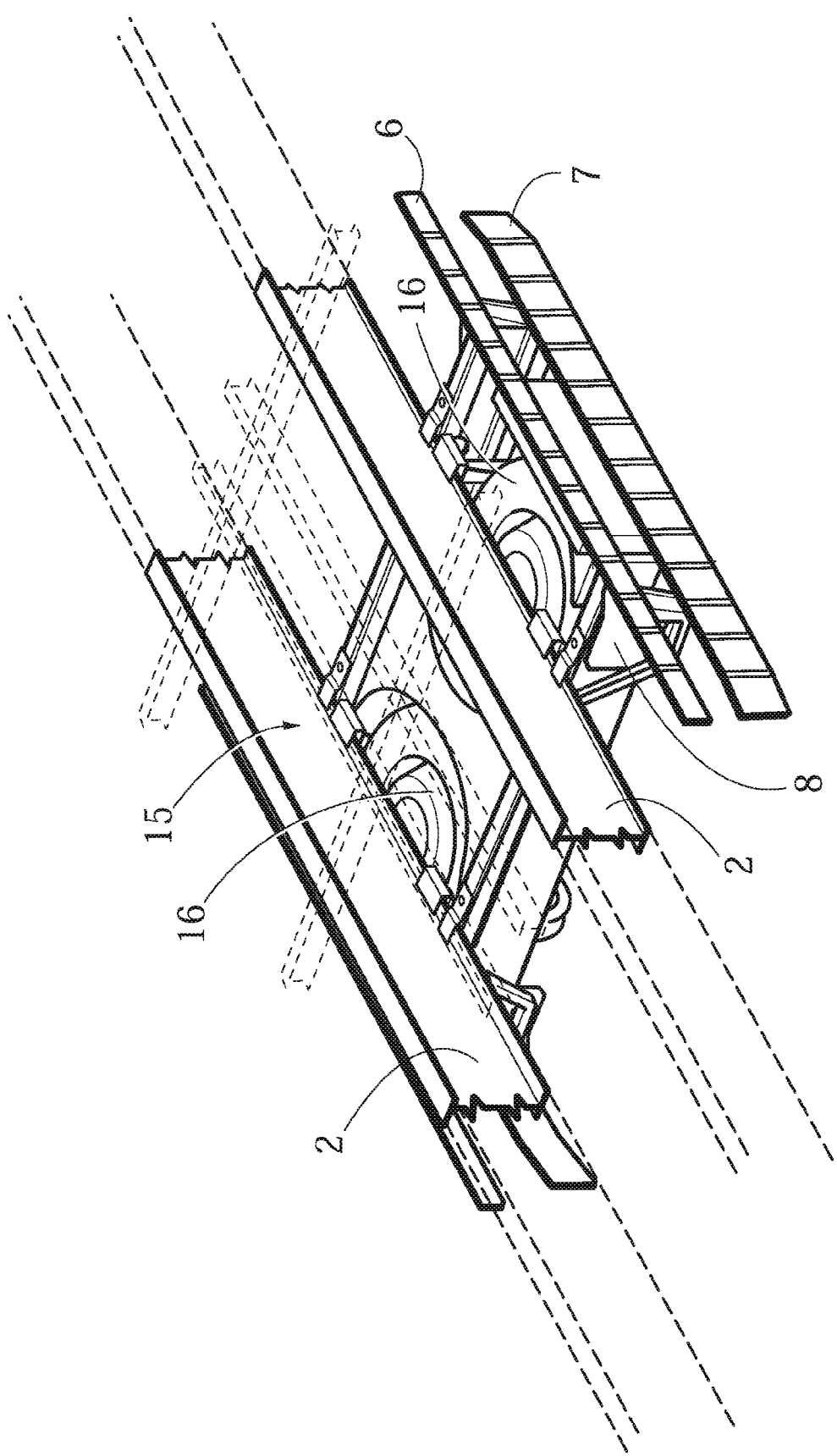
FIG. 3 is a perspective view of a portion of the frame of the vehicle illustrated in FIGS. 1 and 2, with the device according to the invention provided underneath it.
Figure 4:
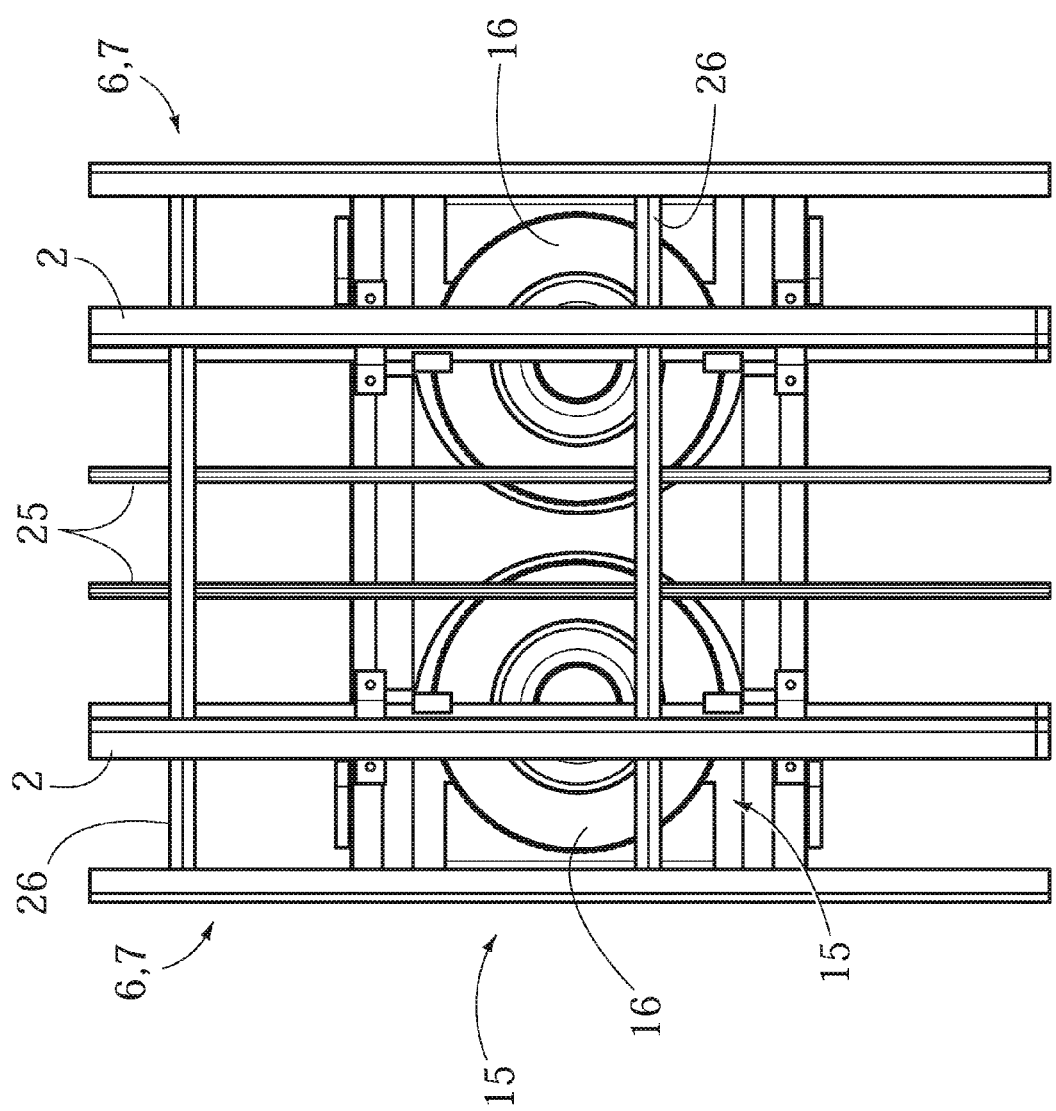
FIG. 4 is a plan view of the detail of FIG. 3.

FIGS. 1 and 2 illustrate a semi-trailer 1 of the type comprising a frame constituted by two side members 2 (see FIGS. 2 and 3) set parallel to one another and at a distance from one another, suspended on wheel axles 3 and carrying a body 4.

The reference number 5 designates as a whole the device according to the invention provided on each side of the vehicle for protection against lateral impact.

Figure 8:
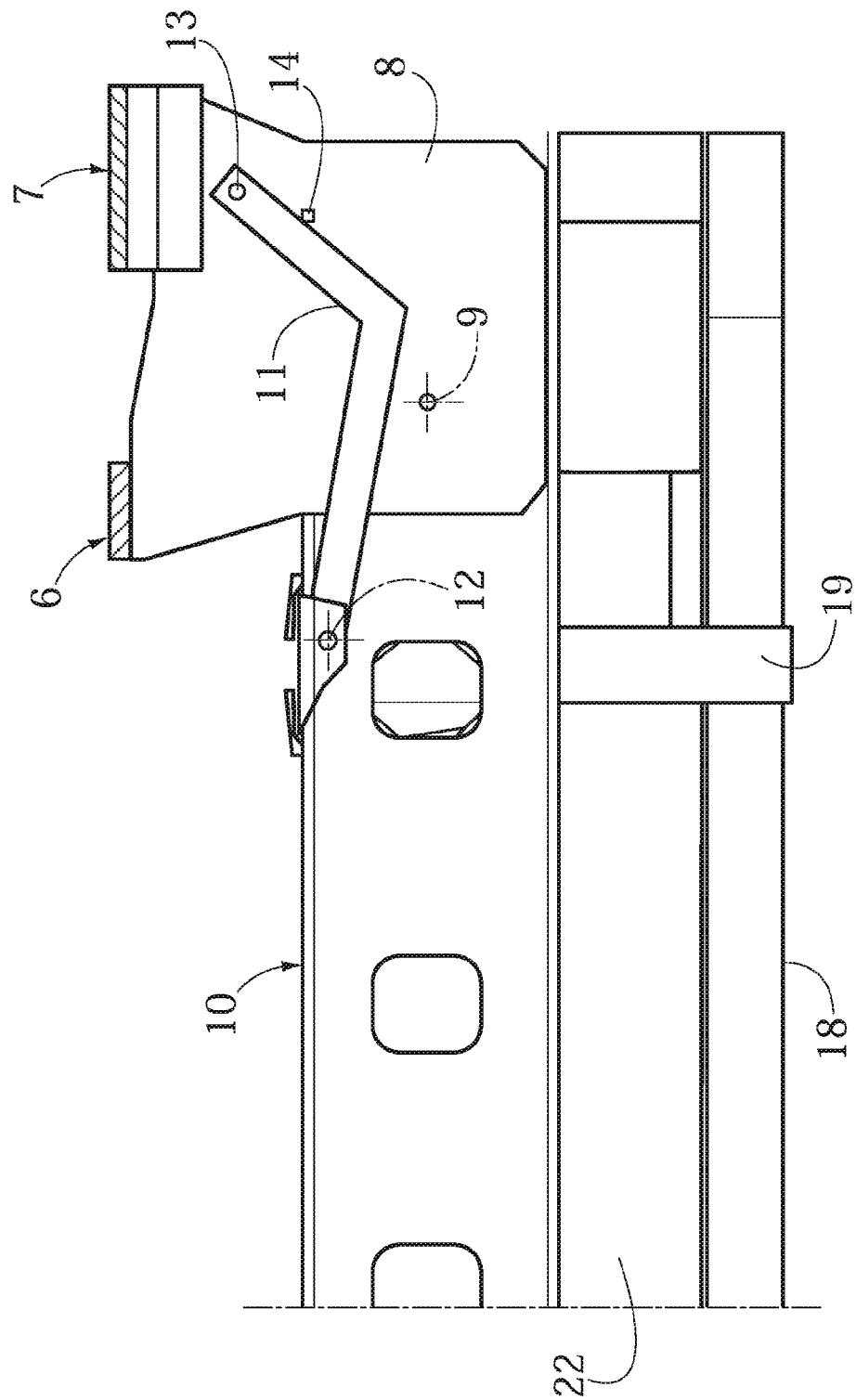
FIG. 8 is a side view at an enlarged scale that illustrates one of the two side-impact guard devices in the inoperative, raised, position.
Figure 10:
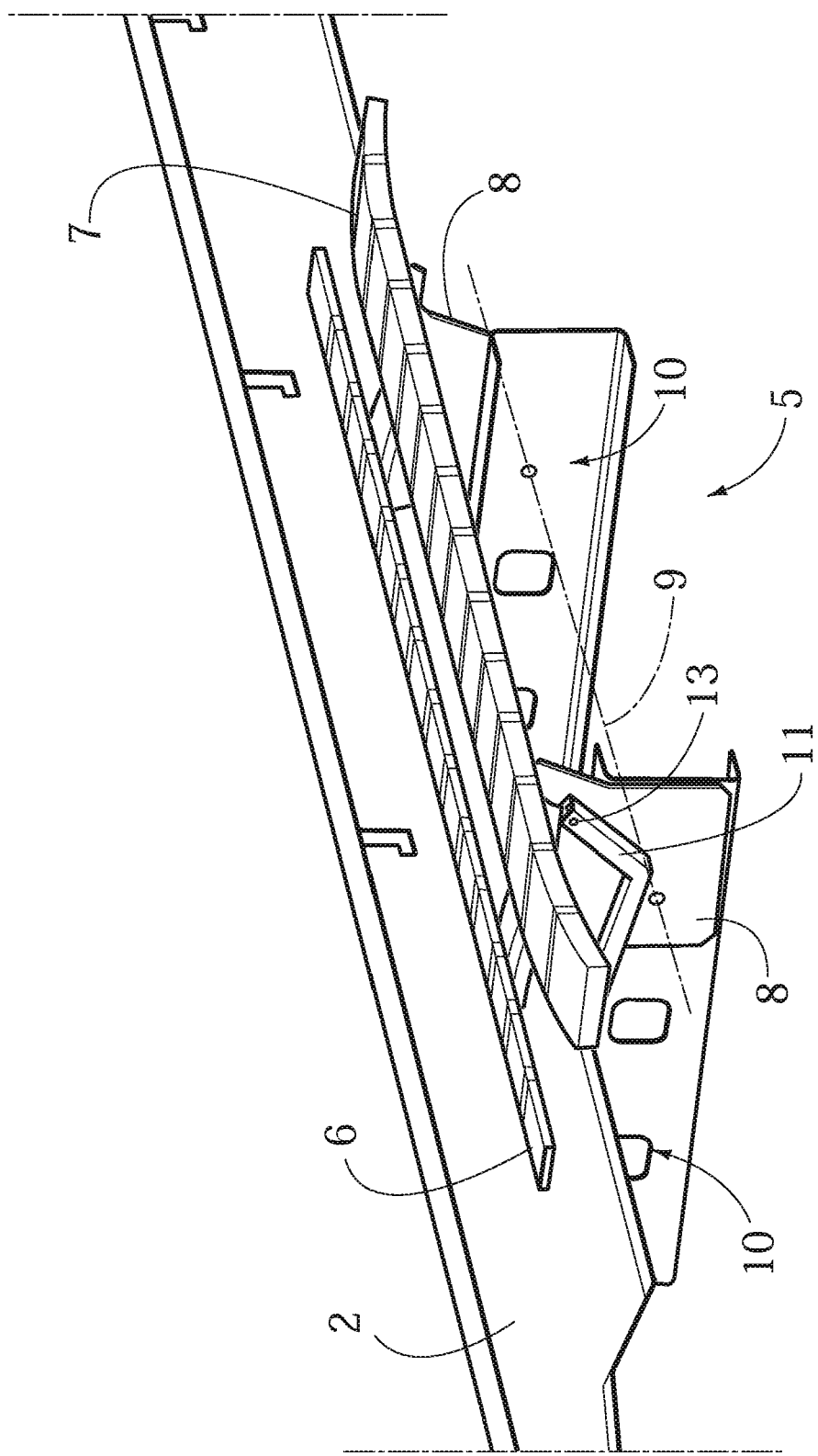
FIG. 10 is a further perspective view of the side-impact guard device in the inoperative, raised, position.

Each device 5 includes a top bar 6 and a bottom bar 7 extending in the longitudinal direction of the vehicle and designed to function as bumper elements for absorbing a lateral impact against the vehicle. As may be clearly seen in FIG. 8, the bars 6, 7 are rigidly connected, for example by means of welding or screwing, to two substantially plane plates 8 arranged in a direction transverse to the longitudinal direction of the vehicle. The two plates 8 are mounted articulated (see FIG. 10) around one and the same axis 9, parallel to the longitudinal direction of the vehicle, on two cross members 10, which in the example illustrated are constituted by steel sectional elements with C-shaped cross sections facing one another. The two cross members 10 are welded underneath the two side members 2 constituting the frame of the semi-trailer, which, in the example illustrated, have, according to the conventional technique, an I section. The cross members 10 together with the bars 6, 7 constitute the system of protection against lateral impact.

Figure 9:
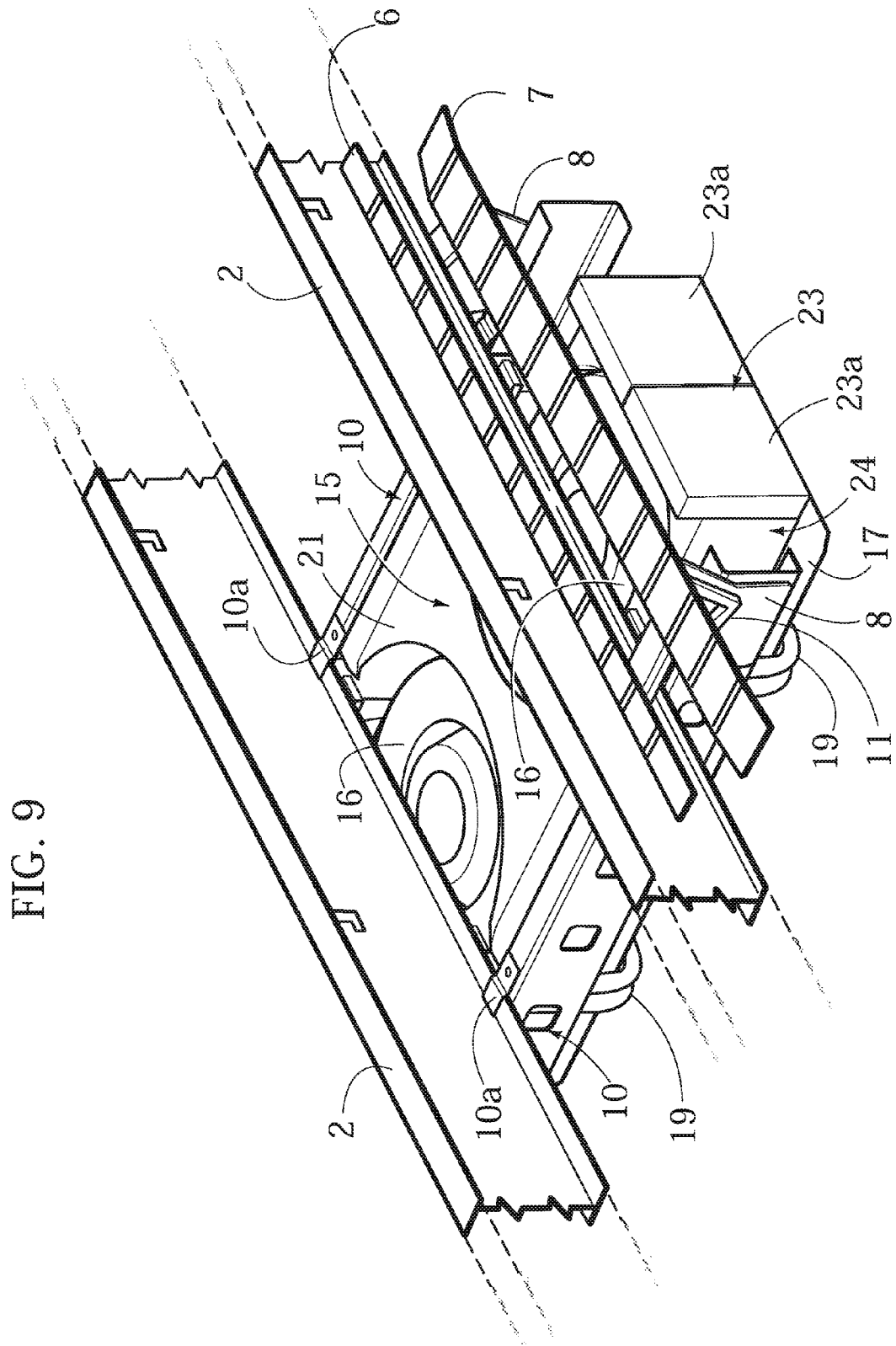
FIG. 9 is a perspective view of the device according to the invention with one of the two side-impact guard devices in the inoperative, raised, position.

Thanks to the assembly articulated about the axis 9, each side-impact guard device 5 can be displaced as a whole between an operative, lowered, position (illustrated in FIGS. 1-3) and an inoperative, raised, position (illustrated in FIGS. 8-10), in which, as will emerge more clearly in what follows, it is possible to gain access to the spare wheels set behind the bars 6, 7. In each of said positions, the impact guard device can be clamped with the aid of two elbow-shaped rods 11, each of which (see FIG. 8) has one end mounted articulated in 12 to a respective cross member 10 and the opposite end that is free and has a through hole 13 for engagement of a locking pin (not visible in the drawings). In the raised position illustrated in FIGS. 8-10 the locking pin is engaged through the hole 13 at the free end of the rod 11 and through a corresponding hole provided in the bracket 8 adjacent thereto. Each bracket 8 moreover has a second hole 14 (see FIG. 8), which is engaged by the locking pin, which also engages the hole 13 of the rod 11 when the impact guard device 5 is instead in the lowered position visible in FIGS. 1-3, so as to lock the device in said position.

Figure 5:
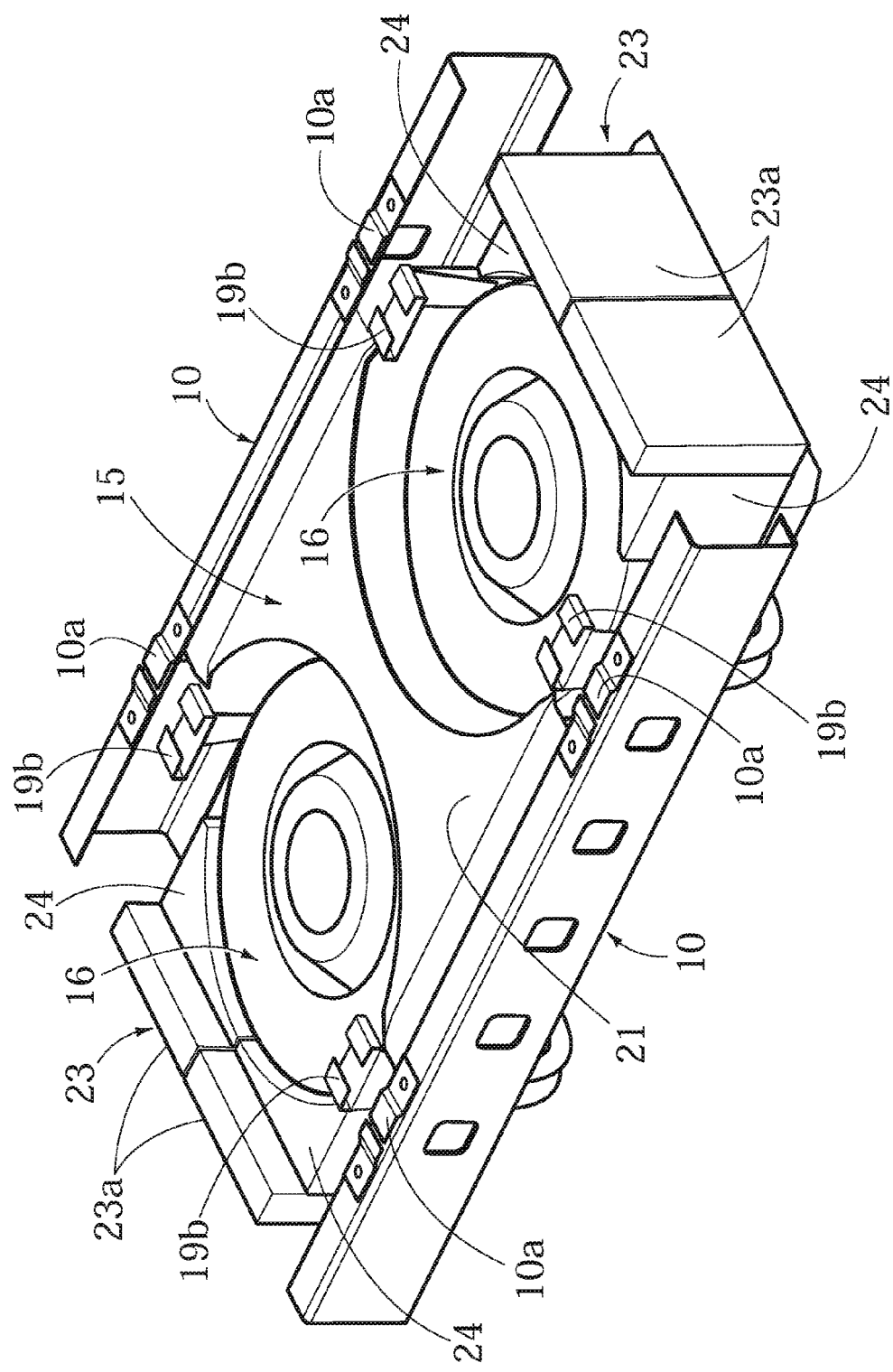
FIG. 5 is a further perspective view of the structure for housing the spare wheels that forms part of the device according to the invention.
Figure 6:
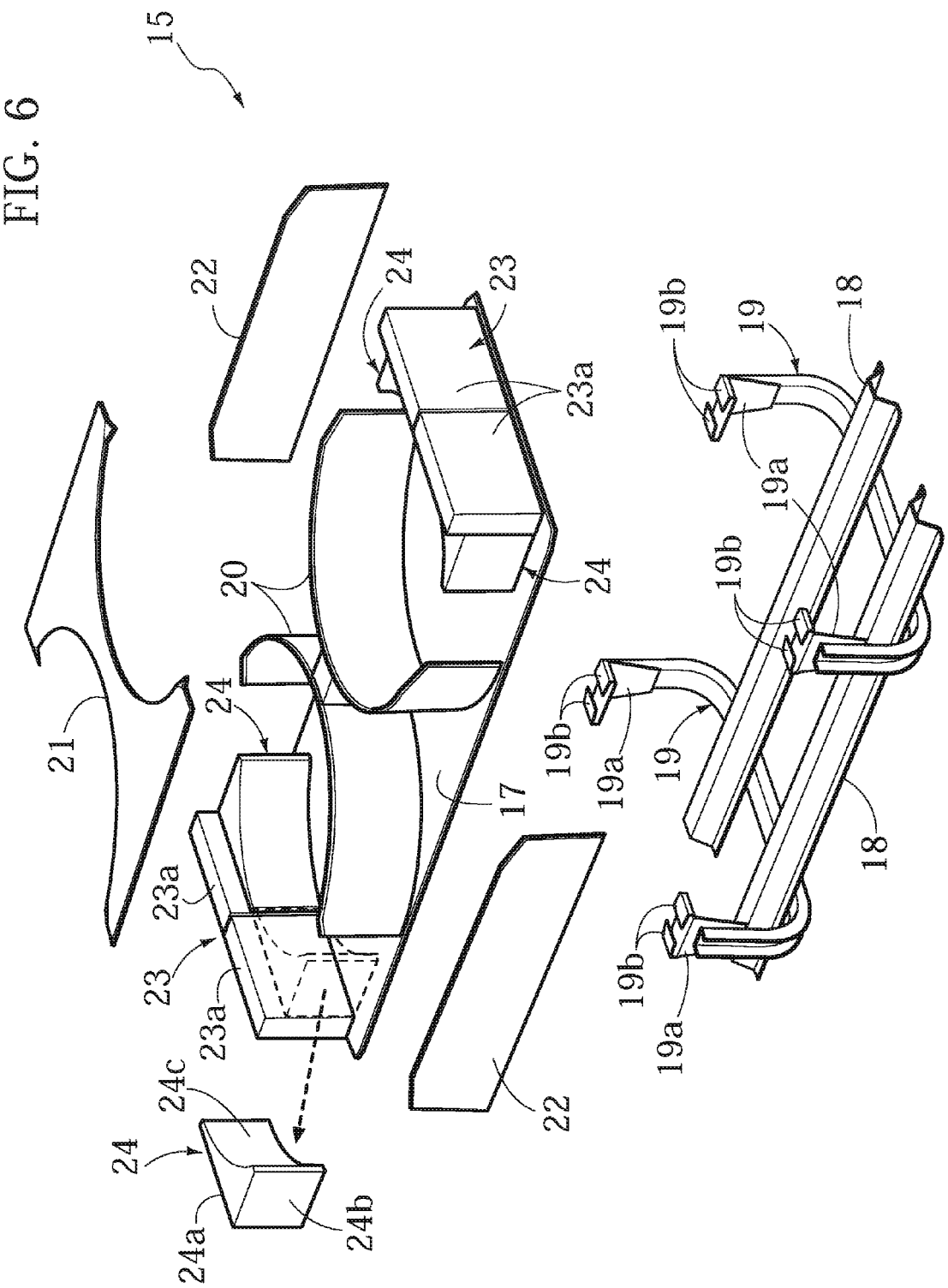
FIG. 6 is an exploded perspective view of the assembly of FIG. 5.
Figure 7:
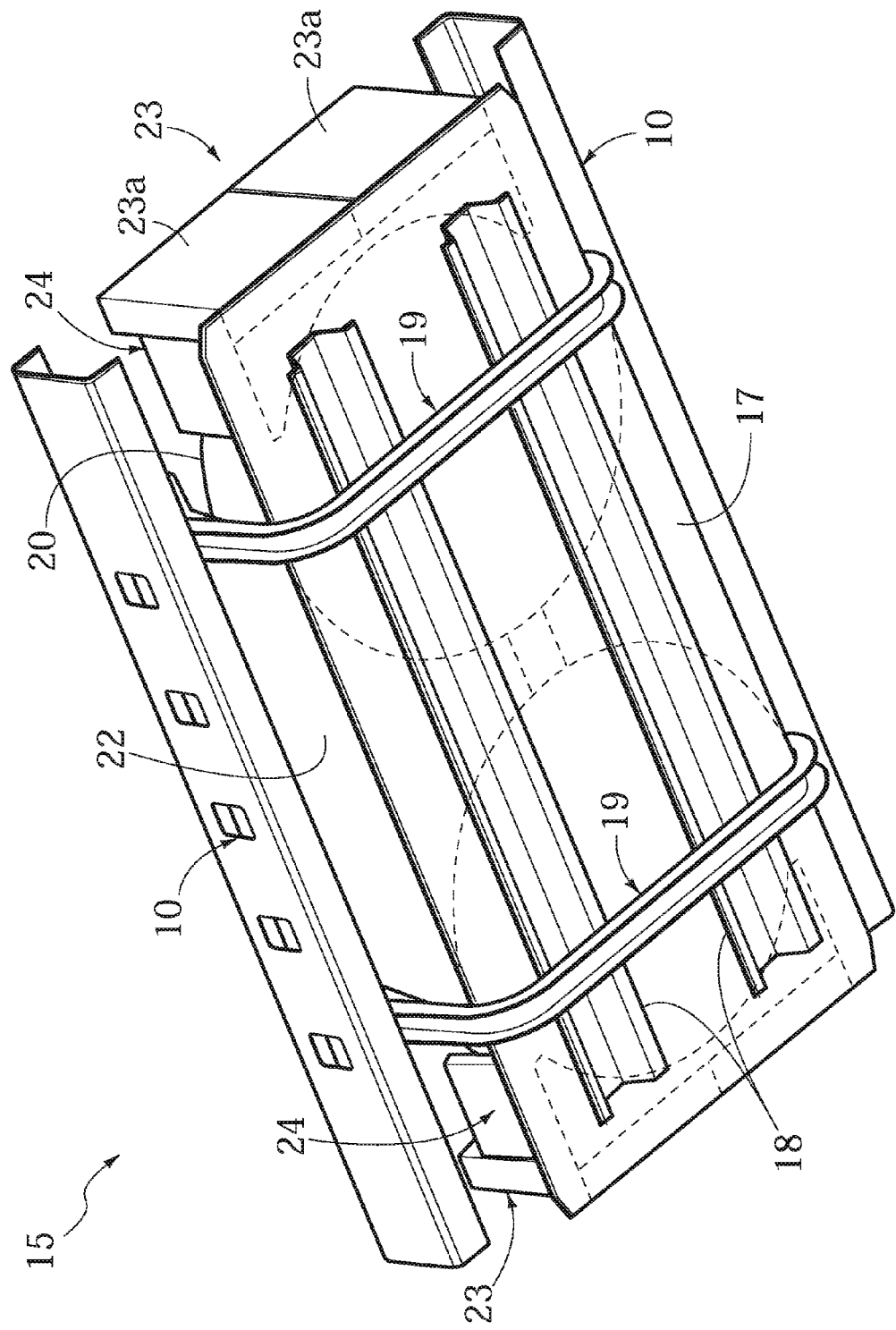
FIG. 7 is a perspective view from beneath of the assembly of FIG. 5.

According to the invention, set between the two impact guard devices 5 provided on the two sides of the vehicle is a structure 15 for housing two spare wheels 16, which is illustrated by itself in FIGS. 5 and 6 of the annexed drawings. In the case of the preferred embodiment, the structure 15 is moreover set between the two cross members 10 fixed underneath the side members 2 and forming part of the system for protection against lateral impact.

With reference to FIGS. 4-7, and in particular to FIGS. 5 and 6, the structure 15 for housing the spare wheels is pre-arranged for receiving and supporting two spare wheels 16 in a horizontal, loaded, position, with the axes of the wheels 16 set vertically and substantially on one and the same vertical plane orthogonal to the longitudinal direction of the vehicle. With reference in particular to FIG. 6, the housing structure 15 comprises a resting surface 17, for example, made of sheet metal, which is rigidly connected, for example by welding or screwing, to two transverse sectional elements 18, which rest in turn on the central branches of two cradles 19 constituted by C-shaped arms set in two longitudinal planes parallel to one another and set at a distance apart. The ends 19a of the cradle-like arms 19 are rigidly connected, preferably in a removable way, to the two side members 2. For instance, in the case illustrated, each of the ends 19a is provided with an attachment including two flanges made of bent sheet metal 19b, which define a seat for receiving a connection element (not illustrated), which can moreover be engaged in a similar attachment 10a fixed on a respective cross member 10 so as to secure the entire structure 15 in a removable way to the two side members 2. Fixed on the resting surface 17 of the structure 15 is a structure, which is set between the two spare wheels 16, comprises two curved and arched walls of sheet metal 20 defining a general substantially X-shaped configuration, the space comprised between the walls 20 being closed at the top by a covering wall of sheet metal 21 and by two side walls 22 rigidly connected in any known way to the walls 20 and/or to the resting surface 17.

Moreover mounted in a removable way at each end of the resting surface 17 are end walls 23, which, in the example illustrated, are each constituted by two separate blocks 23a. In the case of the example illustrated, each of the blocks 23 is rigidly connected to the resting surface 17 by engagement of one or more projections provided on the bottom side of the blocks 23 within respective openings made in the resting surface 17, said projections and said openings not being visible in the drawings.

As an alternative to the use, for the structure 15, of parts made of sheet metal, it is also possible to use parts made of plastic or composite material (including materials such as foamed and honeycomb materials).

As may be clearly seen in FIGS. 5 and 6, set between each end wall 23 and the spare wheel 16 adjacent thereto are two safety chucks 24 of the type traditionally used for safety purposes when the vehicle is standing still, in order to prevent any undesirable movement thereof. Each of the safety chucks 24 is designed to be positioned on the ground, at the side of a wheel of the vehicle. For this reason, each safety chuck 24 has a plane surface 24a (see FIG. 6) for resting on the ground, a plane surface 24b orthogonal thereto, and a concave curved surface 24c for engagement against the tread of the wheel. As may be clearly seen in the drawings, in the present invention provided at each end of the structure 15 for housing the spare wheels 16 are two chucks 24 with their surfaces 24a against the respective end wall 23 and their curved surfaces 24c that define a single arched surface for containment of the spare wheel 16.

In the operative condition of the device according to the invention, both of the side-impact guard devices 5 are in their operative, lowered, position. In said condition, a lateral impact of a motor car 27 (see FIG. 11) against the vehicle 1 is absorbed by the entire chain of elements constituted by the bars 6, 7 located on the side where impact has occurred, by the end wall 23 set behind them (see FIG. 5), by both of the spare wheels 16 and by the corresponding housing structure 15, including the safety chucks 24 set right behind the bars that have undergone impact and the safety chucks 24 set on the opposite side, as well as the end wall 23 and the bars 6, 7 arranged on the side of the vehicle opposite to the one that has undergone impact.

Consequently, in the case of the present invention, the entire structure for housing the spare wheels 16 and the wheels themselves are used together to absorb the energy of a lateral impact, on any of the two sides of the vehicle, transmitting the impact from one device 5 to the opposite one and to the main side members of the trailer. The structure for housing the spare wheels is in any case provided in the vehicle so that its pre-arrangement in the way indicated above in order to perform the second function of absorption of the impact does not entail a substantial complication or increase in weight for the vehicle. In addition, the use of protection structures 5 with two superimposed bars 6, 7 represents a new application, for lateral protection, of the protection bars already in use on the front part of the vehicle, with the further adaptation consisting in the articulated assembly and in the use of the supporting rods 11. In addition, in the case of the preferred embodiment, the aforesaid result is obtained with the aid of the safety chucks 24, which consequently perform a secondary function, which is additional with respect to their primary function.

Figure 11:
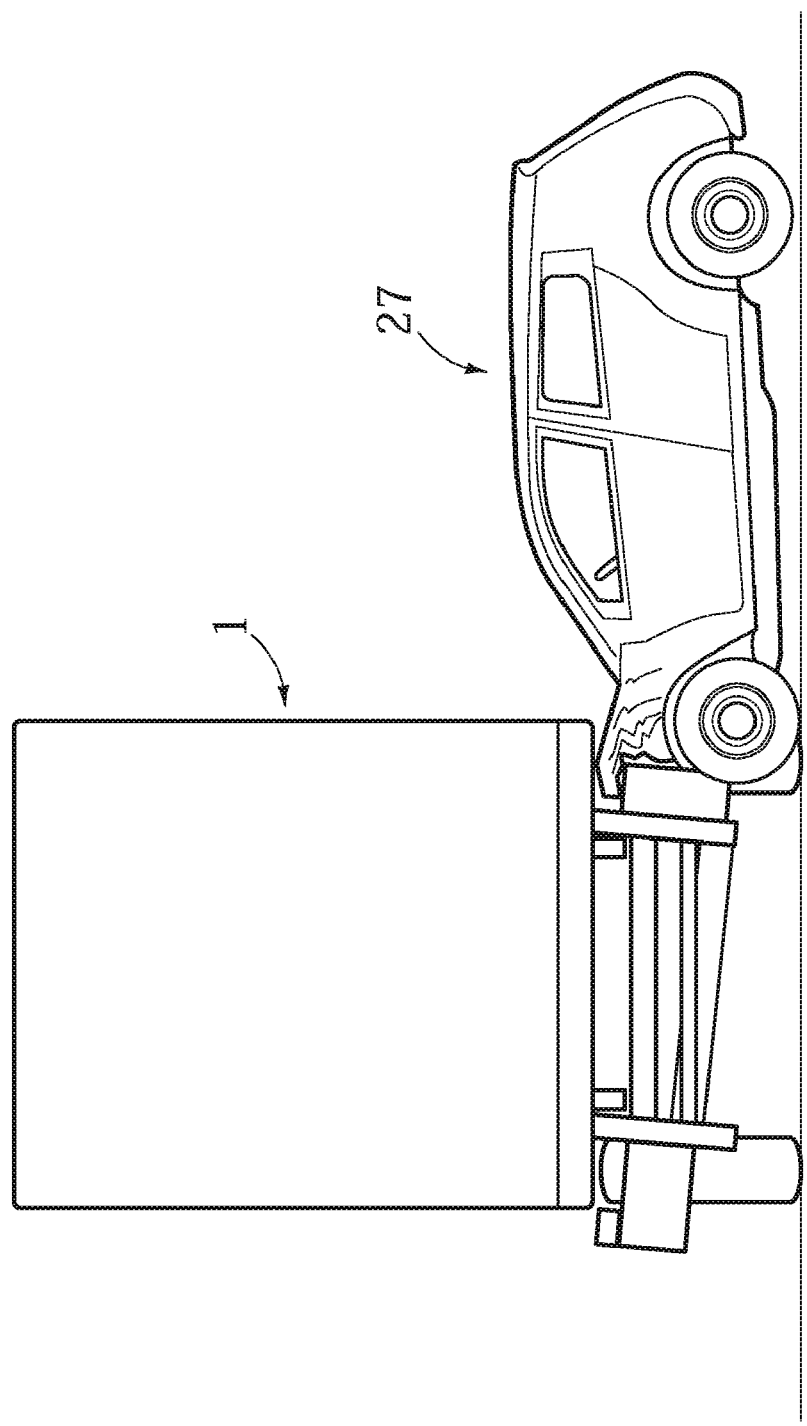
FIG. 11 shows an example of deformation of a motor car following upon impact against a side of the semi-trailer provided with the device according to the invention.

FIG. 11 shows an example of lateral impact of a motor car 27 against a vehicle 1 equipped with the device according to the invention. The figure has been obtained on the basis of a real simulation, in which the speed of impact of the motor car 27 was 68 km/h. The figure shows the effectiveness of the device according to the invention in so far as the passenger compartment of the motor car 27 remains substantially intact.

Of course, without prejudice to the principle of the invention, the details of construction and the embodiments may vary widely with respect to what is described and illustrated herein purely by way of example, without thereby departing from the scope of the present invention.

For example, not ruled out is the case where the housing structure 15 receives a single spare wheel, or else, for instance, the case where only one of the two side protection structures is pre-arranged for being displaced between an operative, lowered, position and an inoperative, raised, position to enable access to the spare wheels. In addition, the details of construction regarding the structure for housing the spare wheels and the way in which said structure is connected to the frame of the vehicle can vary widely with respect to what is described and illustrated herein purely by way of example.

What is claimed is:

1. An industrial vehicle comprising a frame including two side members parallel to one another and set at a distance from one another, and two side-impact guard devices set at the two sides of the vehicle and each comprising at least one bar extending in the longitudinal direction of the vehicle and connected to the aforesaid frame, said industrial vehicle being characterized in that set between the bars of the impact guard devices at the two sides of the vehicle is a housing structure that houses one or more spare wheels, in such a way that said housing structure and the spare wheel or wheels housed therein contribute, together with the aforesaid bars of the two side-impact guard devices, to absorbing the energy of lateral impact against the vehicle, transmitting it from the impact guard device that has undergone impact to the impact guard device set on the opposite side of the vehicle, and wherein each side-impact guard device is connected to the frame of the vehicle in an articulated way about an axis parallel to the longitudinal direction of the vehicle, between an operative, lowered, position and an inoperative, raised, position, for gaining access to the structure for housing the spare wheels.

2. The vehicle according to claim 1, wherein said structure houses two spare wheels in a position lying horizontally, with the axes of the spare wheels set vertically in a plane substantially orthogonal to the longitudinal direction of the vehicle.

3. The vehicle according to claim 2, wherein said structure for housing the spare wheels comprises: a base surface, resting on which are the two spare wheels; and cradle-like supporting means, resting on which is said base surface and which are in turn connected to cross members fixed to the side members of the frame.

4. The vehicle according to claim 3, wherein said cradle-like means comprise two cradle-like arms provided at their ends with attachments for removable connection to the aforesaid cross members.

5. The vehicle according to claim 4, wherein said housing structure comprises two end walls connected to the aforesaid base surface and each set behind a respective side-impact guard device.

6. The vehicle according to claim 5, wherein set between each of said end walls and the spare wheel adjacent thereto are two safety chucks of the type designed to be rested on the ground in a position adjacent to a wheel of the vehicle when it is standing still, in order to prevent any undesirable movement of the vehicle, said chucks being set so as to define a continuous arched surface facing the tread of the spare wheel adjacent thereto and in such a way as to be set between said wheel and the end plate adjacent thereto for contributing to absorption of the energy of impact.

7. The vehicle according to claim 1, wherein the housing structure comprises a body fixed to said resting surface and set between the two spare wheels, defining two arched surfaces facing the tread of said spare wheels.

8. The vehicle according to claim 1, wherein each impact guard device comprises a top bar and a bottom bar rigidly connected to a pair of brackets parallel to one another and set at a distance from one another, mounted articulated to two cross members rigidly connected underneath the side members constituting the frame of the vehicle, each bracket being clampable both in the operative, lowered, position of the impact guard device and in the inoperative, raised, position by means of a rod having one end articulated to the structure of the vehicle and one opposite end that can be locked with respect to a respective plate by means of a locking pin.

9. The vehicle according to claim 1 wherein the vehicle is a trailer or semi-trailer.

* * * * *